Jan. 15, 1963 A. J. BIGGS ETAL 3,073,895

TELEVISION RECEIVER HAVING FINE TUNING APPARATUS

Filed May 12, 1960 2 Sheets-Sheet 1

Jan. 15, 1963 A. J. BIGGS ETAL 3,073,895

TELEVISION RECEIVER HAVING FINE TUNING APPARATUS

Filed May 12, 1960 2 Sheets-Sheet 2

3,073,895
TELEVISION RECEIVER HAVING FINE TUNING APPARATUS

Albert Jesse Biggs, Harrow, and Eric Ribchester, Hanworth, England, assignors to Hazeltine Research, Inc., Chicago, Ill., a corporation of Illinois Filed May 12, 1960, Ser. No. 28,709
Claims priority, application Great Britain June 29, 1959
6 Claims. (Cl. 178—5.8)

*General*

Figure 1:
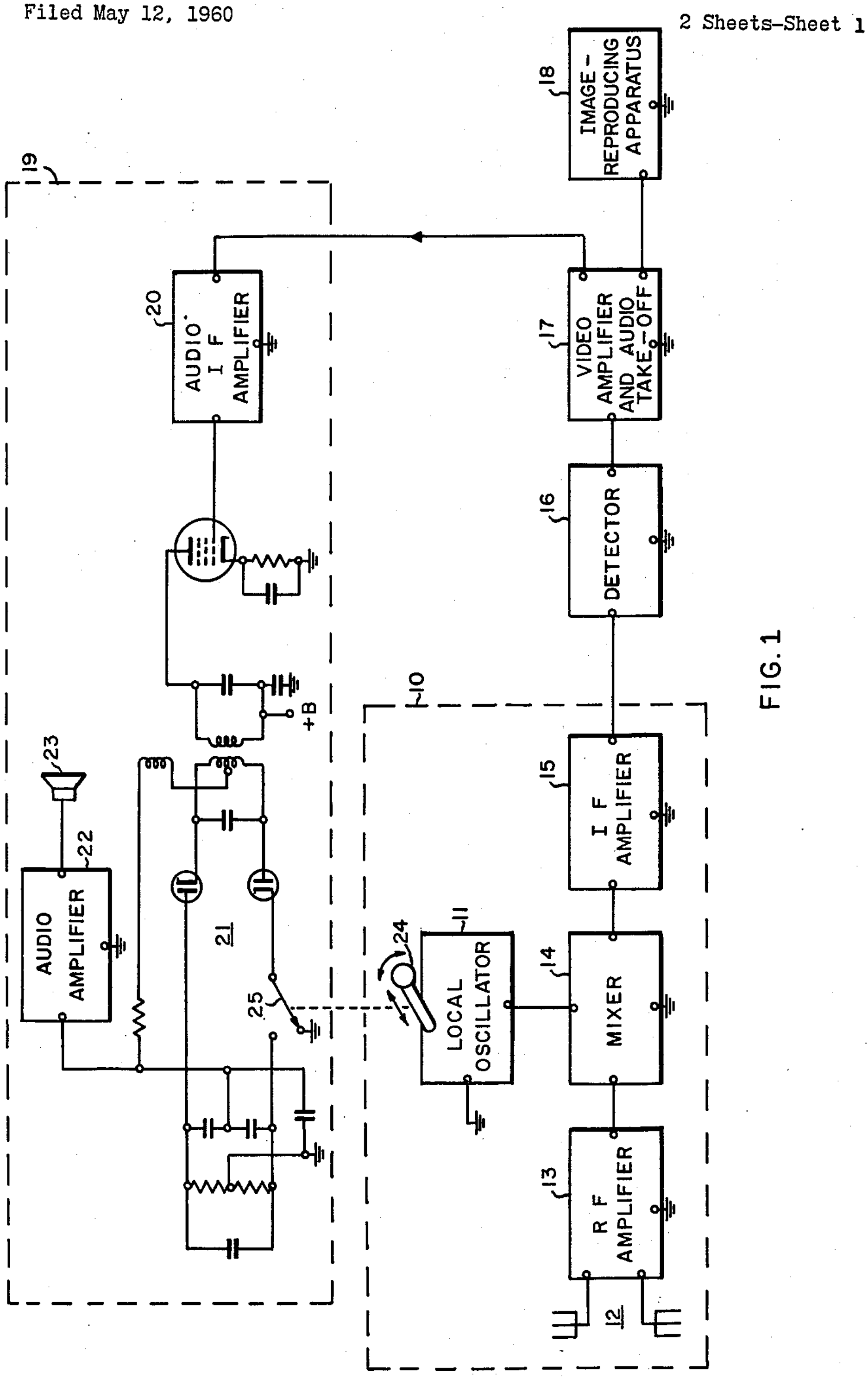

This invention relates to a television receiver having fine tuning apparatus.

The invention is concerned, in particular, with television receivers of the kind adapted to operate on the superheterodyne system and arranged to receive both video and audio signals transmitted in adjacent frequency channels. Furthermore, the video intermediate-frequency amplifier of the receiver has a response curve which has a minimum at a point corresponding to the frequency of the audio intermediate-frequency carrier. Normally, such a receiver includes, in addition to a switching mechanism for adapting the receiver for reception from different broadcasting stations, a fine tuning control for continuously varying the frequency of the output of the local oscillator, the fine tuning control being provided for the purpose of correcting any drift of the local oscillator. This control should normally be adjusted to a setting at which the audio carrier rejection in the video intermediate-frequency amplifier is at a maximum.

Hitherto, television receivers of the kind specified having a fine tuning control have had the disadvantage that it is difficult for a person operating such a receiver to decide which is the correct setting of the fine tuning control, since in operation there may be little difference in the form of the reproduced picture over a relatively wide range of settings of this control.

It is an object of the present invention to provide a new and improved television receiver wherein the above-mentioned disadvantage is alleviated.

In accordance with a particular form of the present invention, in a television receiver of the type wherein at proper tuning the audio carrier is positioned at a minimum point on a pass band and the video carrier is at a higher point, tuning means comprise means for producing a signal which is a beat between the audio and video carriers and which is amplitude-modulated by differences between the audio and video carrier amplitudes and means responsive to the degree of amplitude modulation of the signal for indicating tuning of the receiver by determining that the audio carrier is at the minimum point.

For a better understanding of the present invention, together with other and further objects thereof, reference is had to the following description taken in connection with the accompanying drawings, and its scope will be pointed out in the appended claims.

Figure 2:
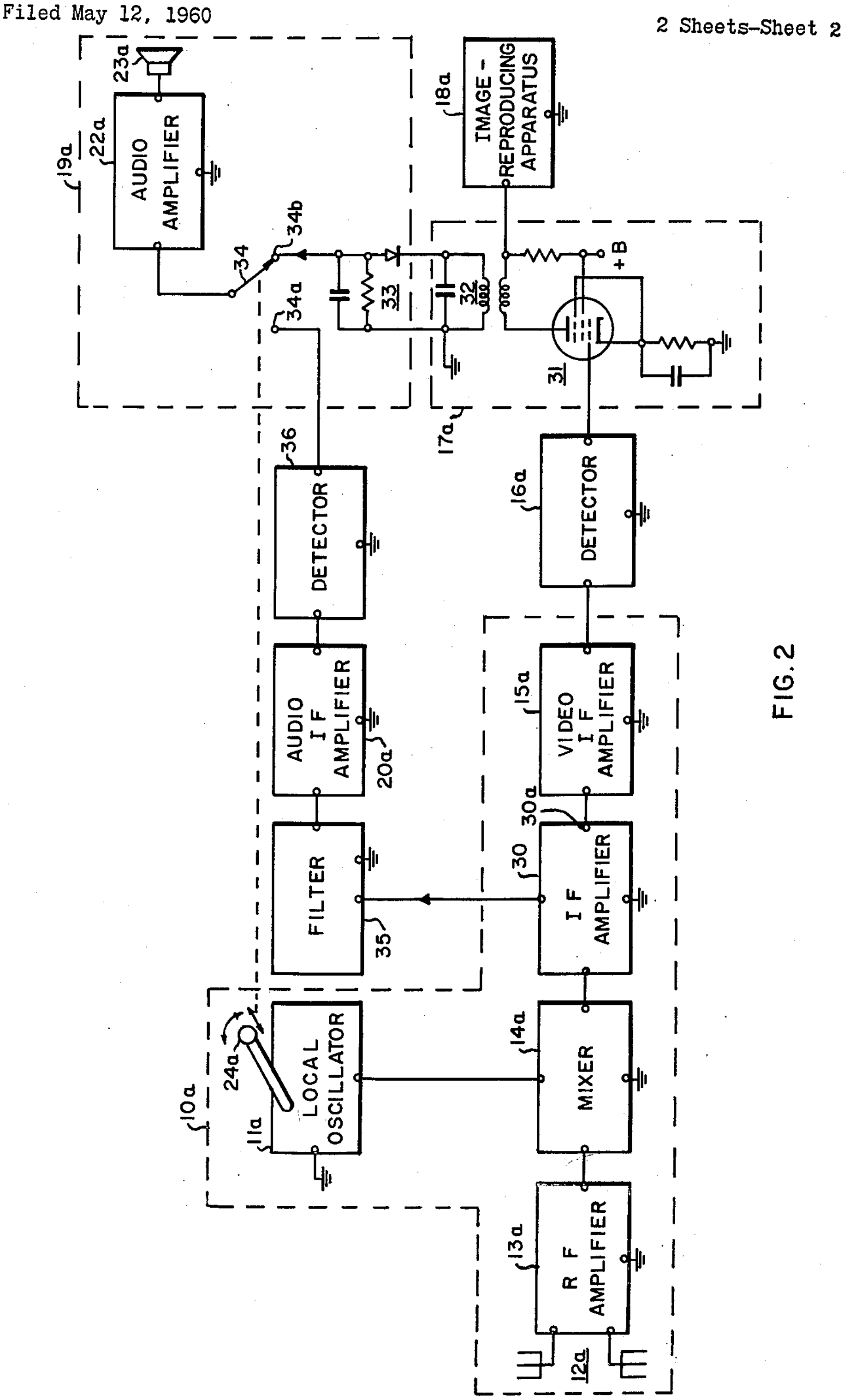

Referring to the drawings:

FIG. 1 shows one embodiment of a television receiver of the intercarrier type, having fine tuning apparatus, constructed in accordance with the present invention, and FIG. 2 shows a second embodiment of a television receiver having separate video and audio channels and having the fine tuning apparatus constructed in accordance with the present invention.

*Description of the FIG. 1 Television Receiver*

FIG. 1 shows one embodiment of a television receiver of the intercarrier type, having fine tuning apparatus, constructed in accordance with the present invention. This receiver is generally very similar to television receivers which are commercially available in the United States and which are designed to receive and reproduce NTSC television signals. Since the operation of such a receiver is well known to those skilled in the art, the construction and operation of the FIG. 1 receiver will not be explained in great detail.

The receiver of FIG. 1 includes means 10, including a local oscillator 11, responsive to a transmitted television signal for developing an intermediate-frequency signal. More particularly, means 10 may additionally include, in the order named, an antenna 12, a radio-frequency amplifier 13, a mixer 14, an intermediate-frequency amplifier 15 and means 24. The circuits included in means 10, except for means 24, may all be of such conventional construction as is normally found in a commercially available television receiver. Means 24 will be explained further below.

The television receiver also includes means 16 for detecting the intermediate-frequency signal and for producing a signal having a frequency corresponding to the difference in frequency between the video and audio carrier signals of the television signal. This signal will be referred to as the difference frequency signal. Means 16 may be a conventional diode detector capable of detecting the video modulation.

The television receiver additionally includes means 17 for selecting the difference frequency signal. More particularly, means 17 may include a conventional video amplifier, normally found in a commercially available television receiver, for amplifying the detected video modulation and supplying the amplified signal to an image-reproducing apparatus 18 such as a cathode-ray tube. The video amplifier 17 also may include a conventional sound trap resonant circuit tuned to the frequency of the difference frequency signal.

The television receiver further includes means 19 responsive to the difference frequency signal for developing indications of the amplitude of the audio carrier signal. More particularly means 19 may include, in the order named, an audio intermediate-frequency amplifier 20, a ratio detector shown generally by the reference numeral 21, an audio amplifier 22 and a loudspeaker 23. The circuits and the loudspeaker 23 included in means 19 may also be of such conventional construction as is normally found in a commercially available television receiver.

The television receiver finally includes means 24 for varying the output frequency of the local oscillator 11, thereby varying the amplitude of the audio carrier signal to obtain an indication when the amplitude of the audio carrier signal is at a minimum, thus causing the tuning of the receiver to be correct. Means 24 may be a knob or other similar device connected to the circuitry of the local oscillator 11 which can be used for controlling the output frequency of the local oscillator. As indicated in FIG. 1 by the two arrows, the knob 24 is capable of being rotated either clockwise or counterclockwise and is further capable of being pushed in or pulled out. Furthermore, a switch 25 in the ratio detector 21 may be mechanically ganged to the knob 24 so that during tuning periods, as the knob 24, for instance, is pulled out, the switch 25 is opened and during normal viewing periods the knob 24 may be pushed back in and the switch 25 is closed.

It will be understood that various elements which would be necessary in practice in the receiver described above have been omitted from FIG. 1 and from the foregoing description, but their position will be obvious to those skilled in the art. For example, conventional arrangements would be provided in the receiver for the utilization of synchronizing signals from the transmitter.

*Operation of the FIG. 1 Television Receiver*

Means 10, responsive to a transmitted television signal received at the antenna 12, develop in the usual manner an intermediate-frequency signal. The intermediate-frequency signal so developed is composed of an amplitude-modulated video carrier signal and a smaller amplitude frequency-modulated audio carrier signal. For NTSC signals, the video and audio carrier signals are separated by 4.5 megacycles. The amplitude of the audio intermediate-frequency carrier signal is normally much smaller than the amplitude of the video intermediate-frequency carrier signal since the intermediate-frequency amplifier 15 has a response curve having a minimum at a point corresponding to the frequency of the audio carrier signal.

Means 16, responsive to the intermediate-frequency signal supplied thereto, operate in the usual manner in detecting the video modulation. In addition, means 16 produce, in the usual manner, a difference frequency signal corresponding to the difference in frequency between the video and audio carrier signals of the television signal. It will be obvious to those skilled in the art that the amplitude of a difference frequency signal is determined by the amplitudes of the two signals between which the difference exists and, more particularly, this amplitude cannot be greater than the amplitude of the smaller of the two signals. Normally, therefore, the amplitude of the difference frequency signal produced by means 16 is determined by the amplitude of the audio carrier signal since, as previously mentioned, the amplitude of this signal is much smaller than the amplitude of the video carrier signal. On the other hand, during peak white portions of the video carrier signal, the amplitude of the video carrier signal is almost zero so that during these periods the amplitude of the video carrier signal is smaller than the amplitude of the audio carrier signal and the amplitude of the difference frequency signal, again being determined by the smaller amplitude of the two signals, is now determined by the video carrier signal. The amplitude of the difference frequency signal is necessarily smaller during peak white portions than during periods of transmission of synchronizing information since the amplitude of the video carrier signal during peak white portions is smaller than the amplitude of the audio carrier signal. Therefore, the difference frequency signal has a varying amplitude having a minimum value representative of the amplitude of the video carrier signal during periods of transmission of peak white video information and a maximum value representative of the amplitude of the audio carrier signal during blanking and synchronizing portions thereof. Since the amplitude of the difference frequency signal changes from a maximum to a minimum at the rates of transmission of the blanking portions, one of these rates being 60 per second, it may be said that the amplitude of the difference frequency signal varies at a 60 cycle per second rate.

Means 17 amplify the detected video signal and supply this amplified signal to the image-reproducing apparatus 18. Means 17 also select, in the sound trap resonant circuit, the difference frequency signal that is produced by means 16, since this resonant circuit is tuned to the difference frequency.

Means 19, responsive to the difference frequency signal, develop indications of the amplitude of the audio carrier signal. The difference frequency signal is amplified by the audio intermediate-frequency amplifier 20 and the amplified signal is supplied to the ratio detector 21. Ordinarily, the amplitude variations of the difference frequency signal are rejected by the ratio detector 21 since this detector is sensitive only to frequency modulation and insensitive to amplitude modulation. If, however, during tuning periods, one leg of the ratio detector 21 is disabled such as by switch 25 as the knob 24 is pulled out, the ratio detector 21 becomes unbalanced and therefore sensitive to amplitude modulation. Therefore, during tuning periods the ratio detector 21 detects amplitude variations of the difference frequency signal and supplies the detector signal to the audio amplifier 22. The audio amplifier 22, in turn, supplies an amplified signal to the loudspeaker 23 whereat audible indications of the amplitude of the audio carrier signal are developed.

The correct fine tuning is accomplished by operation of means 24. During tuning periods the switch 25 may be caused to operate by pulling knob 24 out. As the knob 24 is turned clockwise or counterclockwise, the output frequency of the local oscillator 11 varies, thereby varying the amplitude of the audio carrier signal. This is so since the frequency of the audio carrier signal is being shifted to different points on the intermediate-frequency response curve of the intermediate-frequency amplifier 15. Such changes in the amplitude of the audio carrier signal also cause the maximum value of the difference frequency signal to also change since, as previously mentioned, this maximum value is representative of the amplitude of the audio carrier signal. The changes in the maximum value of the difference frequency signal are, in turn, audibly indicated by the output of the loudspeaker 23. When a minimum-volume-audible-indication is produced by the loudspeaker 23, the tuning is correct. Such minimum volume indicates that the maximum value of the difference frequency signal has been reduced to as low a value as possible and that the audio carrier signal is also a minimum. Since the amplitude of the audio carrier signal is at a minimum, the frequency thereof must necessarily correspond to the frequency of the minimum point on the intermediate-frequency response curve of the intermediate-frequency amplifier 15. Since the video carrier signal is 4.5 megacycles from the audio carrier signal, and should be ideally located 4.5 megacycles from the minimum point on the intermediate-frequency response curve for correct tuning, the video carrier signal must necessarily be located at the ideal frequency on the intermediate-frequency response curve when the amplitude of the audio carrier signal has been set to a minimum. Thus, the tuning of the receiver is correct.

*Description and Operation of FIG. 2 Television Receiver*

FIG. 2 shows another embodiment of a television receiver having separate video and audio channels and having fine tuning apparatus constructed in accordance with the present invention. While the general construction of the television receiver shown in FIG. 2 has certain similarities to the television receiver shown in FIG. 1, the FIG. 2 receiver is generally similar to television receivers which are commercially available in Great Britain and has particular application in that country. Since the operation of such receivers is again well known to those skilled in the art, the construction and operation of the FIG. 2 receiver will not be explained in great detail. Elements in FIG. 2 corresponding to similar elements in FIG. 1 have been given the same reference numerals followed by suffixes.

The television receiver of FIG. 2 includes means **10*a*, including a local oscillator 11*a*, responsive to a transmitted television signal for developing an intermediate-frequency signal. Means 10*a* may additionally include, in the order named, an antenna 12*a*, a radio-frequency amplifier 13*a*, a mixer 14*a*, an intermediate-frequency amplifier 30 and a video intermediate-frequency amplifier 15*a*. The circuits included within means 10*a* may all be of conventional construction and operate in the usual manner for developing an intermediate-frequency signal at the output of the intermediate-frequency amplifier 15*a*. This intermediate-frequency signal is composed of an amplitude-modulated video carrier signal and an amplitude-modulated audio carrier signal. The amplitude of the audio intermediate-frequency carrier signal is normally much smaller than the amplitude of the video intermediate-frequency carrier signal, since again the intermediate-frequency amplifier 15*a*** has a response curve having a minimum at a point corresponding to the frequency of the audio carrier signal. Under the standards used in Great Britain, the video and audio carrier signals are separated by 3.5 megacycles.

The television receiver may also include means 16a for detecting the intermediate-frequency signal and for producing a signal having a frequency corresponding to the difference in frequency between the video and audio carrier signals of the television signal. Again, this signal will be referred to as the difference frequency signal. Means 16a may be of conventional construction and operate in the usual manner in detecting the video modulation and in producing the difference frequency signal.

The television receiver additionally includes means 17a for selecting the difference frequency signal. More particularly, means 17a may include a conventional video amplifier, shown generally by the reference numeral 31, for amplifying the detected video modulation and for supplying the amplified signal to an image-reproducing apparatus 18a, such as a cathode-ray tube. Means 17a may also include a tuned circuit 32, transformer coupled to the video amplifier 31 and tuned to the frequency of the difference frequency signal, namely, 3.5 megacycles.

The television receiver further includes means 19a responsive to the difference frequency signal for developing indications of the amplitude of the audio carrier signal. More particularly, means 19a may include, in the order named, a detector 33, a switch 34 having terminals 34a and 34b, an audio amplifier 22a and a loudspeaker 23a The circuits and the loudspeaker 23a included within means 19a may all be of conventional construction.

The television receiver may additionally include an audio channel composed of a filter 35, an audio intermediate-frequency amplifier 20a and a detector 36. The filter 35 serves as an audio signal take-off from the intermediate-frequency amplifier 30 and the audio intermediate-frequency amplifier 20a and the detector 36 serve to amplify and detect the audio carrier signal, respectively.

The television receiver finally includes means 24a for varying the output frequency of the local oscillator 11a, thereby varying the amplitude of the audio carrier signal to obtain an indication when the amplitude of the audio carrier signal is at a minimum, thus causing the tuning of the receiver to be correct. Means 24a may be a knob or other similar device connected to the circuitry of the local oscillator 11a, which can be used for controlling the output frequency of the local oscillator. As indicated in FIG. 2 by the two arrows, the knob 24a is capable of being rotated either clockwise or counter-clockwise and is further capable of being pushed in or pulled out. The switch 34 in means 19a may be mechanically ganged to the knob 24a so that during tuning periods, as the knob 24a, for instance, is pulled out, the switch 34 is connected to terminal 34b and during normal viewing periods, the knob 24a may be pushed back in and the switch 34 is connected to terminal 34a.

Again, it will be understood that various elements which would be necessary in practice in the receiver described above have been omitted from FIG. 2 and from the foregoing description, but their position will be obvious to those skilled in the art. For example, conventional arrangements would be provided in the receiver for the utilization of synchronizing signals from the transmitter.

The tuning procedure of the FIG. 2 receiver is very similar to the tuning of the FIG. 1 receiver and, therefore, the actual operation will only be briefly described. The intermediate-frequency signal developed at the output of the video amplifier 15a is composed of an amplitude-modulated video carrier signal and an amplitude-modulated audio carrier signal. Again, the amplitude of the audio intermediate-frequency carrier signal is normally much smaller than the amplitude of the video intermediate-frequency carrier signal since the video intermediate-frequency amplifier 15a has a response curve having a minimum at a point corresponding to the frequency of the audio carrier signal. As described in connection with the FIG. 1 receiver, the detector 16a produces and means 17a selects a difference frequency signal, the frequency thereof corresponding to the difference in frequency between the video and audio carrier signals and the amplitude thereof having a maximum value representative of the amplitude of the audio carrier signal, during periods of transmission of video information, and a minimum value representative of the amplitude of the video carrier, during blanking and synchronizing portions thereof. The amplitude variations of the difference frequency signal are detected by the detector 33 of means 19a and are supplied through switch 34 to the audio amplifier 22a, whereat they are amplified and supplied to the loudspeaker 23a. As the knob 24a is turned clockwise or counterclockwise, the amplitude of the audio carrier signal varies and this, in turn, causes a variation in the volume of the audible indication produced by the loudspeaker 23a. When the volume is a minimum the tuning of the receiver then is correct.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a television receiver of the type wherein at proper tuning the audio carrier is positioned at a minimum point on a pass band and the video carrier is at a higher point, tuning means comprising: means for producing a signal which is a beat between the audio and video carriers and which is amplitude-modulated by differences between the audio and video carrier amplitudes; and means responsive to the degree of amplitude modulation of said signal for indicating tuning of the receiver by determining that the audio carrier is at said minimum point.

2. In a television receiver of the type wherein at proper tuning the audio carrier is positioned at a minimum point on a pass band and the video carrier is at a higher point, tuning means comprising: means for producing a signal which is a beat between the audio and video carriers and which is amplitude-modulated by changes in the relative amplitudes of the audio and video carriers which occur as between the video and synchronizing portions of the television signal; and means responsive to the degree of amplitude modulation of the produced signal for indicating tuning of the receiver by determining that the audio carrier is at said minimum point.

3. In a television receiver of the type wherein at proper tuning the audio carrier is positioned at a minimum point on a pass band and the video carrier is at a higher point, tuning means comprising: means for producing a signal which is a beat between the audio and video carriers and which is amplitude-modulated at audio frequency by differences between the audio and video carrier amplitudes; and means responsive to the degree of amplitude modulation of said signal for indicating tuning of the receiver by determining that the audio carrier is at said minimum point.

4. In a superheterodyne television receiver of the type wherein at proper tuning the audio carrier is positioned at a minimum point on an intermediate-frequency pass band and the video carrier is at a higher point, tuning means comprising: means for producing a signal which is a beat between the audio and video carriers and which is amplitude-modulated by differences between the audio and video carrier amplitudes; and means responsive to the degree of amplitude modulation of said signal for indicating tuning of the receiver by determining that the audio carrier is at said minimum point.

5. In a superheterodyne television receiver of the type wherein at proper tuning the audio carrier is positioned at a minimum point on an intermediate-frequency pass band and the video carrier is at a higher point, tuning means comprising: means for producing a signal which is a beat between the audio and video carriers and which is amplitude-modulated by changes in the relative amplitudes of the audio and video carriers which occur as between the video and synchronizing portions of the television signal; and means responsive to the degree of amplitude modulation of the produced signal for indicating tuning of the receiver by determining that the audio carrier is at said minimum point.

6. In a television receiver of the type wherein at proper tuning the audio carrier is positioned at a minimum point on a pass band and the video carrier is at a higher point, tuning means comprising: means for varying the frequency of the local oscillator of a television receiver so as to vary the frequency of the audio and video intermediate-frequency carrier signals; means for combining said intermediate-frequency audio and video carrier signals so as to produce a difference frequency signal, amplitude-modulated at the audio frequency corresponding to the frequency at which synchronizing portions of the television signal recur; means for detecting said resultant audio frequency signal; and means for coupling said audio frequency signal to a reproduction system such that proper tuning of said receiver is indicated by a minimum amplitude of said audio frequency signal.

References Cited in the file of this patent

UNITED STATES PATENTS

| | | |
|---|---|---|
| 2,886,709 | Goldberg et al. | May 12, 1959 |
| 2,943,145 | Parker | June 28, 1960 |
| 3,018,325 | Baugh | Jan. 23, 1962 |